Aug. 21, 1951          J. M. RIBBLE          2,564,791

METHOD FOR MAINTAINING HEATING VALUES OF A FUEL GAS

Filed June 26, 1947

INVENTOR.
John M. Ribble

BY Darby & Darby

Att'ys.

Patented Aug. 21, 1951

2,564,791

UNITED STATES PATENT OFFICE 2,564,791

METHOD FOR MAINTAINING HEATING VALUE OF A FUEL GAS

John Mason Ribble, Bartlesville, Okla., assignor to Phillips Petroleum Company, a corporation of Delaware Application June 26, 1947, Serial No. 757,261

5 Claims. (Cl. 196—8)

This invention comprises a method and apparatus for maintaining a predetermined heating value of a combustible gaseous mixture.

The invention is concerned with means and methods for controlling and/or maintaining the B. t. u. value of the residue gas stream from a natural gasoline extraction plant.

Another object of the invention is to provide means and methods for regulating and controlling the extraction of natural gasoline and liquid petroleum gas constituents from natural gas streams.

Another object of the invention is to provide means and methods for controlling the rate of heat input to the reboiler of a fractional distillation column for the purpose of controlling the heating value of the gaseous fraction produced.

Other and more detailed objects of the invention will be apparent from the following description of the embodiment of the apparatus and method favored at the present time as the most practical.

This invention resides substantially in the combination, construction, arrangement, relative location of parts, steps and series of steps, all as hereinafter clearly set forth.

In the accompanying drawings—

Figure 1:
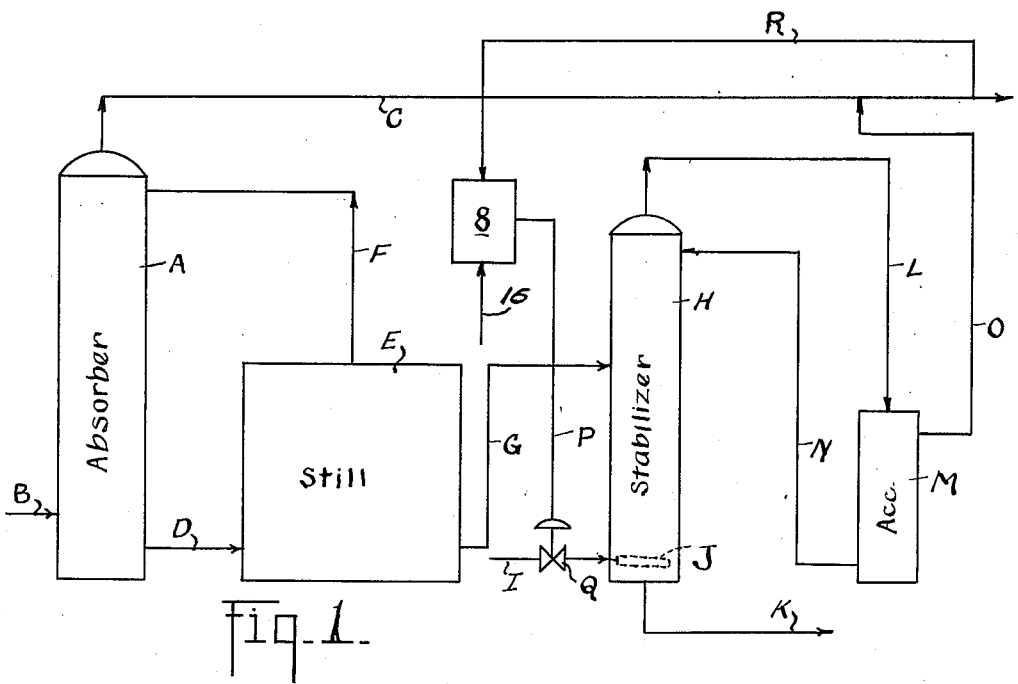
Figure 2:
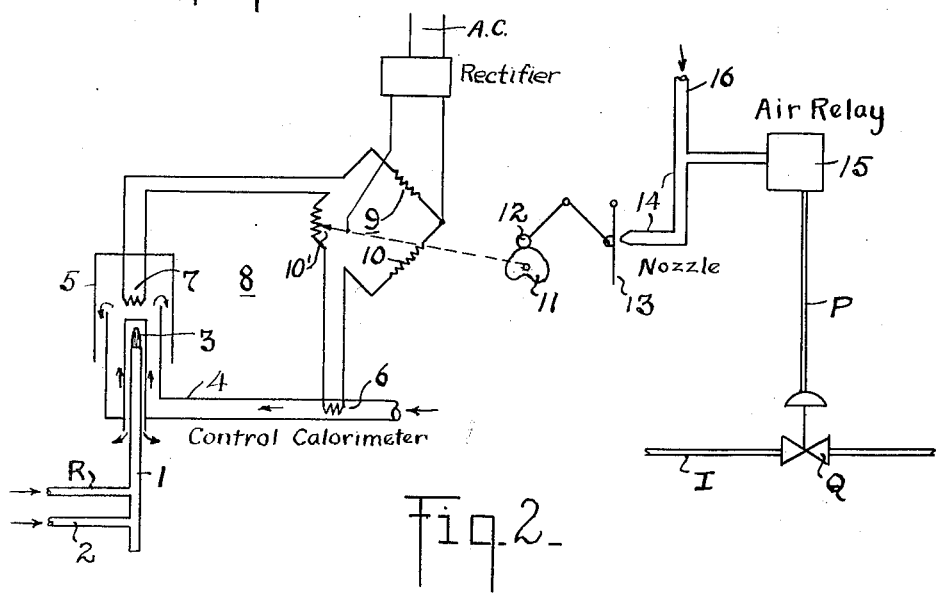

Figure 1 is a diagrammatic and schematic illustration of a fractional distillation system employing the invention hereof; and Figure 2 is a diagrammatic and schematic illustration of the controlling calorimeter forming part of the system of Figure 1.

In the operation of a natural gas processing system for the extraction of natural gasoline and liquefiable petroleum gas fractions, it has been common practice to make provision to recover the gaseous residue as a third fraction of the stream for use as a heating medium. It is well understood that, in the operation of such a system, the residue gas is subject to wide variations in the heating value thereof, requiring, in those cases where the residue gas is to be used as a heating medium, a continuously operating system for maintaining the heating value of the residue gas substantially constant. Most commonly the deviations in the heating value of such residue gas are such as to require an increase in its heating value, which is usually accomplished by blending with the residue gas a gaseous stream of higher heating value. This process is commonly called gas enrichment.

There are many ways of controlling the rate of injection of the enriching stream in order to maintain the residue gas at a predetermined heating value.

In accordance with this invention the residue gas is enriched by controlling the extraction efficiency of a natural gasoline plant by means of a controlling calorimeter and associated control equipment. By this means it is possible to maintain the heating value of the residue gas from such a plant at a predetermined value within the range of the particular plant. There are various ways in which this control may be effected, but in accordance with the preferred embodiment as illustrated herein the raw natural gasoline stabilizer or fractionator of a natural gasoline extraction plant is controlled in accordance with the deviations of the heating value of the residue gas of such a plant from a predetermined value to effect enrichment thereof or, as it might be stated, compensation for such deviation. The system is operated so that the overhead product from the stabilizer is returned to the residue gas line leaving the plant in a controlled proportion such that the residue gas will have a predetermined heating value or fall within a predetermined B. t. u. value range. Further, in accordance with the system herein disclosed, such control is effected in the reboiler or stabilizer by employing a control calorimeter to control the rate of heat input to the reboiler in accordance with the aforesaid heating value deviations.

A typical natural gasoline extraction plant is illustrated in Figure 1 from which is obtained in addition to the desired gasoline product a gas residue. Raw natural gas is introduced to the absorber A through the feed line B. This gas moves upwardly through the absorber countercurrently to the down flow of a lean absorption medium admitted through the line F. As is well known, a suitable absorption medium for this purpose is mineral seal oil. Thus, a natural gas and an absorption medium are brought into contact and the desired natural gasoline constituent and a liquefied petroleum gas fraction are absorbed from the mixture, leaving a residue gas which passes off the top of the absorber through the line C. The enriched absorption medium containing the desired absorbed hydrocarbon constituents is withdrawn from the absorber through the line D into the distillation still or column E where, by the application of heat, the absorption medium is stripped of its absorbed hydrocarbon constituents. The resulting lean absorbing medium is returned through the line F to the absorber for reuse. The hydrocarbon constituents recovered in the still E and commonly known as raw gasoline are delivered by the line G to a stabilizer H which is commonly a fractionator wherein the lighter constituents such as methane and ethane are removed as an overhead product through the line L by the application of heat to the stabilizer H, which is heated in any suitable manner as by a steam coil. As is well understood, by the proper control of temperature in the stabilizer H, propane and even heavier constituents of the feed to the stabilizer may be driven off and withdrawn as an overhead product through the line L. The remaining constituents of the feed to the stabilizer comprising what is commonly known as partially stabilized gasoline is withdrawn through the line K for further processing, commonly known as further stabilization wherein propane and butane may be separated therefrom for use as a fuel in liquefied petroleum gas systems.

The overhead product is withdrawn through the line L which preferably is equipped with condensation means, not shown, to effect total or partial condensation of said vapors. The condensate and uncondensed vapors, if any, are delivered to an accumulator M, and from there a portion is delivered through the line N as a reflux. The uncondensed vapors are withdrawn through the line O and passed into line C for the enrichment of the residue gas.

The raw natural gasoline being fed to the stabilizer H through line G, may comprise a mixture of hydrocarbons from methane through octane, with even small quantities of constituents heavier than octane. It is usually desired to retain the maximum quantity of the propane and heavier hydrocarbons as a liquid kettle product which is withdrawn as partially stabilized gasoline through line K. Under these conditions the overhead vapors withdrawn through line L will consist primarily of methane, ethane and propane. The column is operated under such pressure as to permit of partial condensation of these overhead vapors with the cooling medium available. The condensate in accumulator M will be rich in propane but will also contain some methane and ethane which are generally not desirable as constituents of natural gasoline, hence, should be utilized for fuel or to enrich a residue gas such as that flowing in line C. If accumulator M is operated at minimum pressure and the overhead product withdrawn through line O is in a vapor form, there will thereby be produced a condensate for reflux through line N, which contains the maximum quantity of propane which will thus improve the separation in stabilizer H and retain the maximum quantity of propane in the kettle product stream withdrawn at K.

In order to control the fractionator H in accordance with the principles of this invention a small stream of composite residue gas from the line C is withdrawn through the line R from a point downstream of the point of connection of line O to line C and delivered to a controlling calorimeter diagrammatically illustrated at 8. The gas stream in line R is continuously supplied to the calorimeter which in turn continuously measures the B. t. u. value of the composite mixture being delivered through the line C and in accordance with variations thereof varies the supply of pressure fluid such as air through the line 16 to the line P which is connected to the motor valve Q. Things are arranged so that as the heating value of the gas in line C falls below a predetermined value valve Q is actuated to supply more steam to the steam coil zone. The heating value of the overhead vapors from stabilizer H is increased and therefore the overhead product vapors from accumulator M are of higher heating value. In a broad sense increasing the heat input to the stabilizer H increases the quantity and/or heating value of the overhead vapors in line L, and hence the overhead product withdrawn through line O and delivered to line C. Thus, the heating value of the gas in the line C is returned to a predetermined value. Conversely, should the heating value of the gas in line C rise above the selected value the temperature in the stabilizer will be reduced to deliver a less rich gas, that is a lighter gas mixture through the line L, accumulator M, and line O to line C.

In accordance with this invention a well known and commercially available controlling calorimeter and associated equipment is diagrammatically illustrated at 8 in Figure 2 in sufficient detail to teach one skilled in the art how to employ the system of Figure 1 in practice. A controlling calorimeter is diagrammatically illustrated in this figure employed in such a manner as to effect the objects of this invention. In the preferred embodiment the controlling calorimeter is employed to control the rate of heat input to the reboiler or stabilizer H. However, it will be understood by those skilled in the art that the subject matter of this invention may be employed in such systems in other ways to attain the objects of this invention. Broadly speaking, the system of the invention involves a natural gas extraction process and apparatus wherein the maximum quantity of desired hydrocarbons, that is propane and heavier are recovered as a liquid product while simultaneously yielding a residue gas of constant heating value. Instead of accomplishing this objective by varying the heat input to the stabilizer there are also ways of employing a controlling calorimeter such as illustrated in Figure 2 to accomplish the same overall results. For example, the calorimeter may be employed to control the rate of flow of absorbing medium through the line F. It may be used to control the temperature of the absorbing medium flowing through line F. It may be used to control the back pressure on the accumulator M by a motor valve in the line O, not shown. It can be used to control the reflux rate through the line N. Finally, with the stabilizer H operating with constant heat input, the calorimeter 8 may be employed to vary the rate of overhead product withdrawal from the accumulator M either as a vapor or a liquid with the reflux through the line N being a variable controlled by a liquid level controller on the accumulator M. Thus as the enrichment demand is reduced the separation efficiency in column H will improve because of increased reflux ratio. Thus the maximum quantity of propane will be retained in the kettle product and the maximum of the methane and ethane content of the feed be used for enrichment through line O.

A precisely measured stream of gas is supplied through the line R which is the line R of Figure 1, to a manifold 1 to which is also supplied a precisely measured stream of primary combustion air by means of line 2. This gas and air mix in the manifold 1 and the mixture is delivered to and burned in a burner 3 which is entirely enclosed in a chamber from which the products of combustion can be withdrawn. A precisely measured stream of secondary or so-called absorbing air is admitted through the line 4, the end of which forms a cylindrical housing about the flame chamber and which in turn is enclosed by means of a casing 5 concentric therewith and spaced therefrom. This structure is arranged so that the heat generated by the flame 3 is transferred to the absorbing air. The air supply line 4 has mounted therein a resistance thermometer 6 for measuring the temperature of the absorbing air. Likewise, a resistance thermometer 7 is arranged at the point within the housing 5 where it will accurately measure the temperature of the absorbing air after it has been heated by the burner. The resistance thermometers 6 and 7 are mounted in adjacent arms of a Wheatstone bridge 9. In one of the arms of the other pair is a fixed resistance 9 and in the remaining arm is a variable resistance 10. A variable resistance 10' is connected into the bridge as shown and the value thereof changed by the movement of the cam 11 to which it is connected as shown. There are many types of variable resistances available for this purpose of which the well known slide wire potentiometer is suitable. A movable part of the potentiometer or recording potentiometer, if it be of the recording type, is connected in any suitable manner to effect the rotation of a cam 11. A cam follower 12 is interconnected in any suitable manner with a pivotally mounted flapper or baffle member 13 positioned adjacent the discharge end of an air nozzle 14 to which air or other compressed vapor is delivered from a suitable source through the line 16. Also connected to the line 16 is a pressure fluid operated relay valve 15 for controlling the supply of pressure fluid to and from the diaphragm motor actuated valve Q through the line P. Air operated controllers of this type are also available commercially in many forms.

As the heating value of the gas supplied through the line R varies the balance of the bridge 9 will be disturbed by reason of the changing temperature difference between the entrance temperature of the absorbing air through the line 4 and its temperature after it has absorbed the heat combustion. Thus, the amount of current flowing through the arm of the bridge containing the potentiometer will vary, and as a result the recording controller will be actuated to re-establish balance through which it follows that cam 11 will rotate. This movement of the cam will result in varying the position of the flapper 13 with regard to the discharge orifice of the nozzle 14. As the baffle 13 moves closer to the discharge orifice the pressure in the line 16 will build up operating the pressure fluid operated relay valve 15 to cause the diaphragm valve Q to operate in the proper direction to vary the rate of supply of steam through line I to the coil J to correct for deviations of the heating value of the gas in line C from a predetermined value. As is well understood in the art, the apparatus can be adjusted to maintain a substantially steady heating value of the gas in line C and to change the temperature in the stabilizer H in the proper direction to compensate for deviations above or below the desired heating value.

Those skilled in the art will immediately appreciate that the system herein disclosed is capable of variation in its details without departure from the subject matter of the novel combination herein described. As an example, the pressure fluid operated valve Q might be replaced by a motor actuated valve and the relay 15 might be modified to effect an electrical control of the valve without departing from the novel combination. I do not, therefore, desire to be strictly limited to the disclosure as set forth herein for illustration purposes, but only as required by the claims granted me.

What is claimed is:

1. A method of controlling the heating value of a residue gas from a hydrocarbon separation system comprising, continuously burning a predetermined quantity of an enriched mixture of residual gas and the overhead product of the fractionator of the system, measuring the heating value of such gas mixture and varying the heat input to the fractionator of said system in accordance with changes in said heating value, withdrawing a high heating value product from the upper portion of said fractionator in accordance with said heat input, and mixing said product of high heating value from said fractionator with said residue gas to vary the heating value of said residue gas in a direction to maintain a predetermined heating value.

2. A method of operating a hydrocarbon separating system to control the heating value of the residue from said system comprising, the steps of separating a hydrocarbon mixture into an overhead gaseous product and a liquid, heating said liquid to recover a second gaseous product therefrom, admixing said second gaseous product with said overhead gaseous product to form the residue gas of the system, continuously burning a predetermined quantity of said residue gas, measuring the heating value of said burning gas and varying the heat input to said liquid to vary the composition of the said second gaseous product recovered therefrom in accordance with the deviations of said heating value from a predetermined value to produce a residue gas of substantially constant predetermined heating value.

3. A process for treating a hydrocarbon gas comprising contacting a stream of said gas in an absorption zone with an absorbent whereby a major portion of propane and heavier constituents and a minor proportion of ethane and lighter constituents contained in said gas are absorbed, withdrawing unabsorbed gases as a residue gas from said absorption zone, passing said absorbent enriched by the absorbed gases to a distillation zone, recovering the absorbed gases as a liquid, passing said liquid to a fractionation zone, withdrawing an overhead vapor product containing a variable quantity of propane, admixing said vapor with said residue gas to yield a composite gas of predetermined heating value, burning a predetermined quantity of said composite gas, measuring the heating value of said composite gas, and varying the heat input to said fractionation zone so as to vary the quantity of propane in said vapor product.

4. The method of operating a gaseous hydrocarbon separating system to control the heating value of the final gaseous product of said system, wherein a gaseous hydrocarbon mixture is separated into a hydrocarbon liquid and a residue gas comprising, feeding said hydrocarbon liquid into a fractionator, removing a light hydrocarbon gaseous product of variable heating value therefrom, mixing said light gaseous product with some of said residue gas to form a final composite gas, continuously burning a measured quantity of said composite gas and measuring the heating value of said gas, and varying the heat input to said fractionator to increase said input with decrease in the heating value of said composite gas and to reduce said heat input with increase in the heating value of said composite gas to alter the heating value of the variable gaseous product of said fractionator, and thereby to maintain the heating value of said composite gas at a substantially constant predetermined level.

5. In a method of treating a hydrocarbon gas mixture to control the heating value of the final gaseous product of said system by which the gas mixture is contacted with an absorbent wherein a major proportion of propane and heavier constituents and a minor proportion of ethane and lighter constituents in said gas mixture are absorbed, and unabsorbed gases are withdrawn as a residue gas, the improvement comprising passing said absorbent containing said dissolved constituents to a distillation zone as a liquid feed, recovering the said absorbed constituents, passing said recovered constituents to a fractionation zone, withdrawing an overhead product containing a variable quantity of propane from said fractionation zone, admixing said product with said residue gas to yield a composite gas of predetermined heating value, burning a predetermined quantity of said composite gas, and measuring the heating value of said composite gas, and increasing the heat input to said fractionation zone so as to increase the quantity of propane in said product with decreases in the measured heating value thereof, and decreasing the heat input to said fractionation zone so as to decrease the quantity of propane in said product with increases in the measured heating value.

JOHN MASON RIBBLE.

REFERENCES CITED

The following references are of record in the file of this patent:

UNITED STATES PATENTS

| Number | Name | Date |
| --- | --- | --- |
| 1,704,101 | Pinkerton | Mar. 5, 1929 |
| 1,769,373 | Kruse | July 1, 1930 |
| 1,851,743 | Wadsworth | Mar. 29, 1932 |
| 2,072,384 | Schmidt | Mar. 2, 1937 |
| 2,086,808 | Kallam | July 13, 1937 |
| 2,168,683 | Raigorodsky | Aug. 8, 1939 |